United States Patent [19]

McBride

[11] Patent Number: 4,488,424
[45] Date of Patent: Dec. 18, 1984

[54] PULLER AND CABLE BENDER EMPLOYING SOCKET WRENCH MEANS

[76] Inventor: Thomas D. McBride, 559 Chestnut St., Westwood P.O., N.J. 07675

[21] Appl. No.: 496,601

[22] Filed: May 20, 1983

Related U.S. Application Data

[62] Division of Ser. No. 322,959, Nov. 19, 1981, abandoned, which is a division of Ser. No. 158,322, Jun. 10, 1980, Pat. No. 4,315,422.

[51] Int. Cl.³ .......................... B21D 9/05; B21J 13/08
[52] U.S. Cl. ......................................... 72/387; 72/458
[58] Field of Search ................ 72/212, 217, 308, 387, 72/457, 458; 81/3 R

[56] References Cited

U.S. PATENT DOCUMENTS

| 3,824,834 | 7/1974 | Durham | 72/387 |
| 3,888,101 | 6/1975 | Crees | 72/388 |
| 4,052,879 | 10/1977 | Crees | 72/388 |

Primary Examiner—E. Michael Combs
Assistant Examiner—Charles Rosenberg
Attorney, Agent, or Firm—Ralph R. Roberts

[57] ABSTRACT

There is disclosed point-of-use apparatus that is actuated by a pair of socket wrench handles. This device allows one man working in a confined area, such as a cabinet or junction box, to bend tubing, pipe or cable; pull cable or rope or cut soft cable or rope on a job location without the assistance of a co-worker and providing a high degree of accuracy. This device provides apparatus for bending pipe or cable or may be used for pulling cable. This apparatus includes end plates that are spaced a determined distance from each other by means of connecting rods. The rods may also carry bushings for bending cable, pipe, tubing or thin walled conduit to a specific diameter. The second apparatus is designed to cut soft cable, tubing, rope and the like and is also actuated by the same or a like socket wrench handle.

4 Claims, 11 Drawing Figures

PULLER AND CABLE BENDER EMPLOYING SOCKET WRENCH MEANS

This is a divisional application of U.S. application Ser. No. 322,959 11-19-81 now abandoned which was a divisional application of Ser. No. 158,322 6-10-80 and now U.S. Pat. No. 4,315,422 issued Feb. 16, 1982.

DESCRIPTION OF THE PRIOR ART

Apparatus or mechanism for bending sheet metal, cable, tubing and the like items are well known. Conventionally this apparatus is adapted for special applications and most often this apparatus is made for bench use. Many requirements for the maintainence mechanic to make bends or repairs at the job provide less than adequate equipment. These repairs are performed in a larger machine or apparatus. In particular, difficulty is found when the bending of sheet metal, cable or pipe is at the point of use. Cable or pipe is often to be bent at point of use. Often the working space for repair is minimal or practically non-existant. The mechanic is hampered in making this repair because the equipment is often not available and when available is not portable.

The bending of metal is usually with bending brakes which are usually secured to a work bench or in a vise mounted on a work bench. Bending of cable and tubing is also by mandrel and by guides that are held or secured in and by mounting to a work bench or vise. Attempts to make and supply portable benders are shown in several patents among which is U.S. Pat. No. 3,824,834 to DURHAM as issued June 23, 1974. In this and others known to the Applicant the use of socket handle wrenches or handles and particularly ratchet wrench handles to actuate separable, non-pivotable retained bending apparatus is not disclosed.

The apparatus hereinafter disclosed is primarly portable and for use in and by a mechanic at the point of use. The several patents and the known apparatus do not provide an inexpensive and versatile type of equipment that is easily stored and carried in a hand tool box that can be set up and used by the mechanic without the need of auxiliary supports and/or a vise support.

SUMMARY OF THE INVENTION

This invention may be summarized, at least in part, with reference to its objects. It is an object of this invention to provide, and it does provide, accessory attachments to be used with socket-type handles for point of use bending of sheet metal, cable, pipe and/or pulling of cable or cutting of cable without the need for auxiliary support.

It is a further object of this invention to provide, and it does provide, attachments that are used as like pairs with handles for socket drives. These attachments and the conventional handles enable sheet metal, cable and pipe to be bent up to right angles without the need for coupling assists, benches or vise supports. Also provided is apparatus for cable pulling and cutting.

In brief, this invention provides simple attachment members that may be easily carried in a tool caddy and at the point of use and with socket drive wrenches provide the desired operation to be achieved. As a bending tool for sheet metal there are two like holders which are positioned and with set screws secure a length of sheet metal of a thickness one-quarter of an inch and less and with two wrench handles bend the secured sheet metal into the desired angle. There is also shown a cable bender for light to heavy cable. As with the sheet metal bender this cable bender also uses two socket-type drive wrench handles. A pull disk for use with the cable bender is also provided as is a shear-type cable cutter for use with a drive socket wrench.

In addition to the above summary the following disclosure is detailed to insure adequacy and aid in understanding of the invention. This disclosure, however, is not intended to fully describe each concept no matter how it may later be disguised by variations in form or additions. For this reason there has been chosen a specific embodiment of a sheet metal bending attachment a cable and tube bender and/or puller and a cable cutter as adopted for use with socket-type handles. This specific embodiment has been chosen for the purposes of illustration and description as shown in the accompanying drawings wherein:

BRIEF DESCRIPTION OF THE DRAWINGS

In the following description and in the claims various details are identified by specific names for convenience. These names are intended to be generic in their application. Corresponding reference characters refer to like members throughout the several figures of the drawings.

SHEET METAL BENDER OF FIGS. 1 THROUGH 6

Referring next to the drawings in which is shown the sheet metal bender of FIGS. 1 through 6, the bending attachment includes like or substantially like retaining blocks generally identified as 20. Each retainer block includes upper and lower jaw portions 22 and 24 joined by an end wall portion 26. This end wall portion contains or has secured to it a socket 28. As depicted this socket is for a one-half inch square drive but any suitable socket may be used as long as the socket readily fits standard handles.

Figure 2:
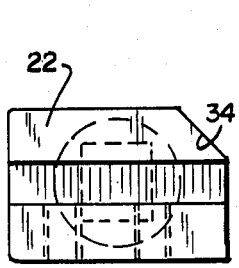
FIG. 2 represents a felt end of the bending attachment of FIG. 1, this view taken on the line 2—2 and looking in the direction of the arrows.
Figure 1:
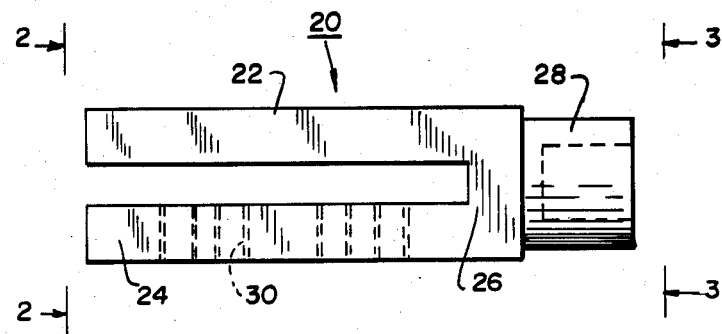
FIG. 1 represents a side view of the sheet metal bending attachment for use with a socket-type wrench handle, this view substantially in full scale.
Figure 4:
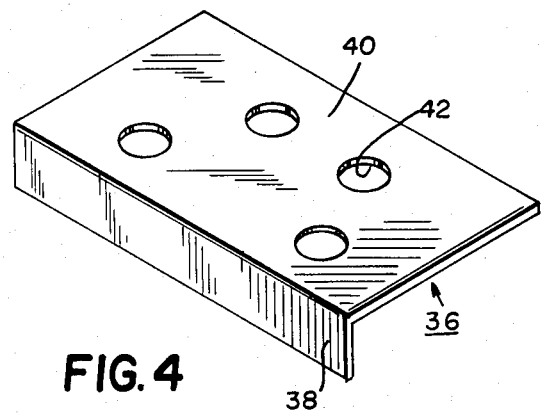
FIG. 4 represents an isometric view of sheet metal shim to be used with the attachment of FIG. 1.
Figure 3:
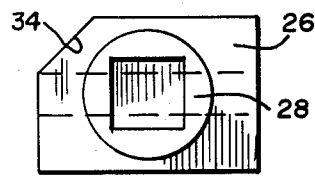
FIG. 3 represents an end view of the attachment of FIG. 1, this view taken on the line 3—3 and looking in the direction of the arrows.

This lower jaw portion 22 has a plurality of through threaded apertures 30 and in each is mounted socket headed set screws 32. The top jaw 22 has one edge formed with a forty-five degree bevel edge portion 34. As viewed in FIG. 2 this is the right edge. As seen in FIG. 4 the bender includes a plurality of shims generally identified as 36. Each shim is preferably of sheet metal and is bent into a sharp right angle to provide a short edge portion 38 and a larger shelf support portion 40. In this shelf portion 40 are a plurality of clearance holes 42 which are spaced and sized for the through passage of the set screws 32.

Figure 5:
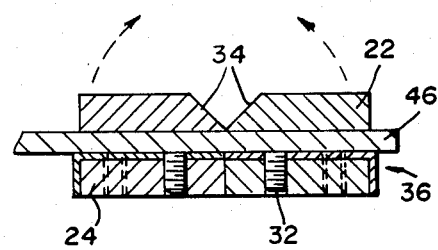
FIG. 5 represents a sectional side view in a reduced scale and in a diagrammatic view showing the placement of the attachment for bending of a sheet metal member.

As seen in FIG. 5 there are two retaining blocks 20 arranged with their beveled edge portions 34 facing each other and with the retaining blocks in a contiguous position. A strip of sheet metal 46 is shown in FIG. 5 and is urged against the upper jaw portion 22 by set screws which are turned to move upwardly through holes 42 in shim 36. The shims are selected as to thickness to close most of the space between the strip of sheet metal 46 and the lower jaw portions 24.

Figure 6:
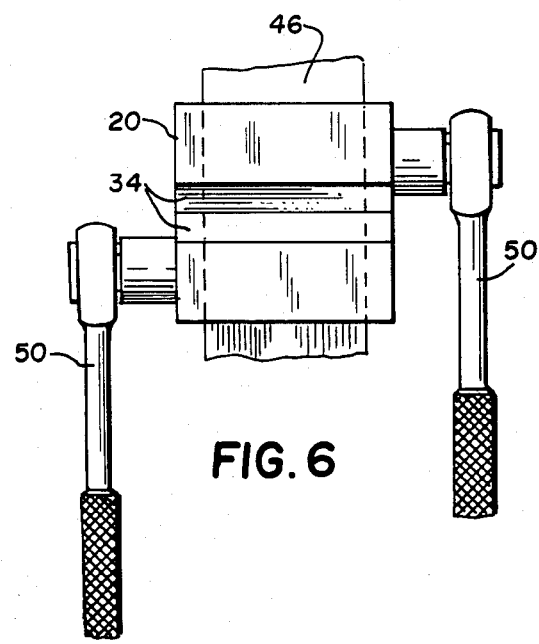
FIG. 6 represents a diagrammatic view showing the attachment of FIGS. 1 and 5 with a ratchet wrench mounted in sockets and adapted to bend the sheet metal.

In FIG. 6 the bending of the sheet metal strip is depicted with ratchet handles 50 shown as with their square shank drive portions inserted into the socket portion 28. In use the handles 50 are adjusted so that the blocks 20 are turned toward each other around a point where the beveled edges 34 meet (see FIG. 5). The bending is made around this point with the sheet metal strip 46 bent to the desired amount which is not more than ninety degrees. It is to be noted that where the sheet metal is rather thin or the surface is not to be marred by set screws the shims 36 may be positioned so that the screws move only the shim while tightly urging and retaining the sheet metal strip 46 in position during bending.

Ratchet wrench handles 50 are inexpensive and are usually in every mechanics stock of tools. The handles need not be ratchet types but may be straight handles with or without swivel capability. The socket 28 is shown as one-half inch square drive but can be metric square or hex. The socket size and type is merely a matter of choice. The depicted retaining block is shown without about two and one-half inch opening in width and one quarter inch in thickness but this is merely a matter of preference since larger retaining blocks and handles can be provided. The blocks and handles are not connected to each other but are separate members or pieces to be stored for point-of-use capability and without the need for a bench, vise or other auxiliary assist.

Figure 8:
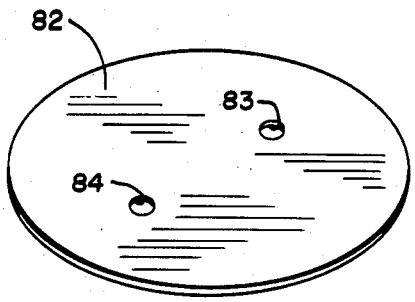
FIG. 8 represents an isometric view of an auxiliary disk for use with bending apparatus of FIG. 7, this disk used with bending and cable pulling.
Figure 7:
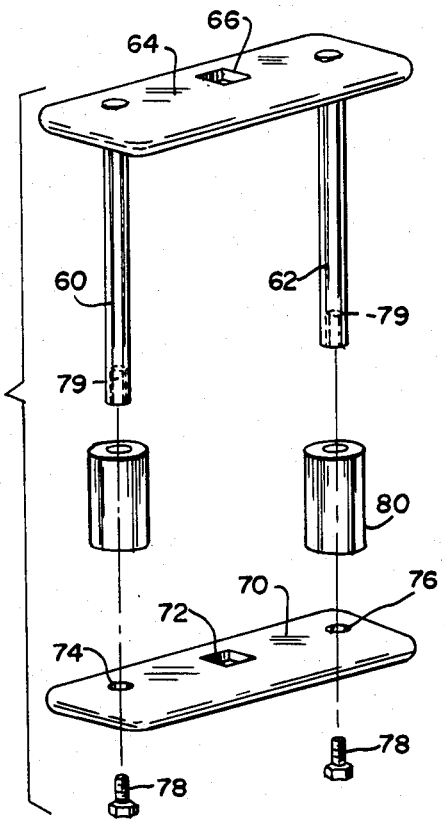
FIG. 7 represents an exploded view of apparatus or attachment whereby tubing and/or cable may be bent to provide the desired bend.
Figure 9:
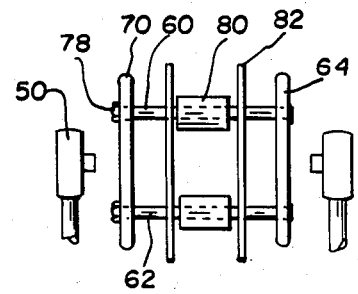
FIG. 9 represents a side view, partly diagrammatic and in a reduced scale of the apparatus of FIGS. 7 and 8.

BENDER FOR TUBING AND CABLE OF FIGS. 7, 8 and 9

For tubing and cable the bending is also made by employing the handles 50 as seen in FIG. 6. In the apparatus of FIG. 7 there is provided a pair of posts 60 and 62, the upper ends of which are secured as by welding to header plate member 64. This plate member also contains a square aperture 66 to accept and retain a drive shank from the wrench. Rather than the formed aperture a socket having the desired drive opening could also be attached to the outer surface of the header plate member 64.

A loose or lower plate member of a similar size and thickness to the header member is also provided. This plate member is generally identified as 70 and has a formed aperture 72, like 66, and through bolt apertures 74 and 76 for cap screws 78 which enter into threaded apertures 79 in the ends of the posts 60 and 62. Bushings 80 may also be used to shape and size the bends in the cable or tubing. The diameter of posts 60 and 62 establish the minimum diameter or radius of bend that can be made in cable or tubing. The slip-on bushing 80 establishes the desired diameter or radius of bend to be achieved.

USE AND OPERATION OF THE APPLIANCE OF FIGS. 7, 8 and 9

Figure 11:
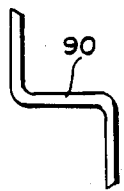
FIG. 11 represents a diagrammatic side view showing the bending of a cable for use in a control box or like mounting where bends may be made in an already placed cable.

As seen in FIG. 9 the bushings 80 are mounted on posts 60 and 62. Disks 82 are also mounted on these posts. A cable to be bent is brought between the bushings 80 and then handles 50 are turned to make the bend in the cable. The direction of bend and extent of bend is a matter of selection. For example, a cable 90 shown in FIG. 11 may be bent in two directions as shown or may have a series of bends. This appliance may also be used for pulling cable. An end portion of cable or rope is secured to the appliance and then the assembly rotated to draw the cable. Rope may also be used to draw the cable in the conventional manner with the apparatus of FIG. 9 being used as a puller.

CABLE CUTTER OF FIG. 10

Figure 10:
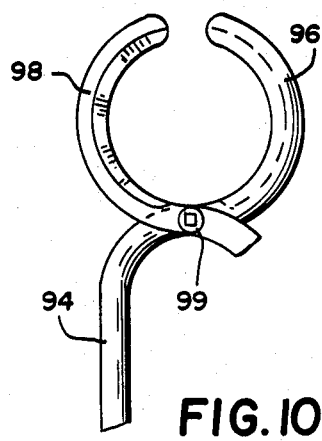
FIG. 10 represents a plan view, partly diagrammatic, of a cable cutter with a short cutting jaw that is actuated by a socket-type wrench handle.

Referring next and finally to FIG. 10, there is depicted a cable cutter having circular cutting jaw portions that are actuated in a scissor manner. A handle portion 94 is pivotally actuated and includes the arcuate shaped cutting jaw portion 96. A like and oppositely disposed cutting jaw portion has a short jaw member 98 actuated by a one-half inch or three-quarter inch square drive socket 99. Other sizes of sockets and shapes may of course be provided. The cable cutter is shaped so that the cutting jaw portions 96 and 98 enclose and do not slip from the cable to be cut. The handle 94 is grasped and the jaws manipulated to bring the cutter to the desired position and condition. The short jaw 98 is moved by a ratchet wrench or handle 50 as with the other appliances. The cutting jaw portions 96 and 98 are shown with sharpened arcuate portions but this does not preclude equally effective cutting edges. It is only necessary that at least one jaw be actuated by a wrench handle mountable in socket 99. It is also contemplated that the long handle portion 94 can be eliminated and that the jaw 96 be actuated with and by another wrench handle 50. The cable cutting apparatus is merely for the convenience of a point-of-use mechanic and is to permit the cutting in confined spaces such as in walls, cabinets and the like in which the long fulcrum handles of conventional cutters cannot be used.

The embodiments shown and described provide appliance assists for the point-of-use mechanic particularly where and when the bench-type accessories are not available or practical. The several appliances or assists employ the use of socket-type wrench handles that provide the fulcrum forces needed to make the bends or cuts above described. The sheet metal bender may be used on a rail or member of an existing machine without disassembly of the machine. The bending appliance of FIGS. 1 through 6 is easily slid in place and as two units are not coupled together as most bending brake attachments. The cable and tube bender of FIGS. 7 through 9 likewise are readily mounted and removed from cable and/or tubing. In particular, electricians "running" cable, particularly heavy cable, have to make correcting bends in already installed or strung cable. The bending apparatus shown above can be mounted on an existing cable for bending, after which the bending appliance can be removed from the prepared cable and/or tube. The cutter enables the short jaw to be moved by a ratchet wrench. Often a cable cutter with like long handles cannot be used and a hack-saw may not be available or satisfactory for cutting a cable because of the restricted area or cabinet for controls.

There are as many size bushings 80 as are normally used by the mechanic to make the desired bends in the cable or tubing. The apparatus of FIG. 7 may or may not be used with the bushings 80. Two disks 82 (FIG. 8) may be mounted on the posts 60 and 62. Apertures 83 and 84 are formed in these disks to enable these disks 82 to be readily mounted on the posts 60 and 62.

In FIG. 9 there is depicted in a reduced scale the appliance of FIG. 7 with posts 60 and 62 having bushings 80 mounted thereon. Disks 82 are shown mounted on these same posts and outside of the bushings 80 and interior of header plates 64 and 70. The apertures 66 and 72 in plates 64 and 70 are used to mount a drive extension of a ratchet wrench handle 50.

Terms such as "left", "right", "up", "down", "bottom", "top", "front", "back", "in", "out" and the like are applicable to the embodiments shown and described in conjunction with the drawings. These terms are merely for the purposes of description and do not necessarily apply to the position in which the bender and puller employing socket wrench handles may be constructed or used.

While particular embodiments of the bending and pulling attachments have been shown and described it is to be understood the invention is not limited thereto since modifications may be made within the scope of the accompanying claims and protection is sought to the broadest extent the prior art allows.

What is claimed is:

1. Apparatus for bending and/or pulling tubing, cable and the like, said apparatus actuated by two ratchet wrench handles and including:
    (a) an end plate having a drive means provided therewith and adapted to receive and be moved by ratchet wrench;
    (b) a pair of rods secured to this end plate and movable therewith;
    (c) a second end plate also having a drive means provided therewith and adapted to receive and be moved by a ratchet wrench, said second end plate having apertures therein adapted to mate with the pair of rods;
    (d) means for securing said rods to the second end plate when desired, and
    (e) a bushing of selected diameter rotatably mountable on each rod to assist in sizing the bending and/or pulling when the apparatus is turned by ratchet wrenches.

2. Apparatus for bending and/or pulling as in claim 1 in which the means for securing the rods to the second end plate includes threaded holes in the ends of the rods, said rods secured by cap screws that pass through the apertures in said second plate and into the threaded holes in the rods.

3. Apparatus for bending and/or pulling as in claim 2 which further includes guide disks which are slidably mountable on said rods, each disk having through apertures spaced and sized to slide along the rods.

4. Apparatus for bending and/or pulling as in claim 2 in which the drive means provided in each end plate is an aperture sized to receive a drive shank portion of a socket wrench.

* * * * *